US007131859B1

(12) United States Patent
Zumbrunnen et al.

(10) Patent No.: US 7,131,859 B1
(45) Date of Patent: Nov. 7, 2006

(54) HEAT DISSIPATING CAGES FOR OPTICAL TRANSCEIVER SYSTEMS

(75) Inventors: Michael L. Zumbrunnen, Rochester, MN (US); Leland L. Day, Rochester, MN (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 11/294,909

(22) Filed: Dec. 6, 2005

(51) Int. Cl.
*H01R 33/945* (2006.01)

(52) U.S. Cl. ...................................... 439/487; 439/577

(58) Field of Classification Search ................ 439/487, 439/577, 607, 609; 361/719
See application file for complete search history.

(56) References Cited

U.S. PATENT DOCUMENTS 5,901,263 A * 5/1999 Gaio et al. .................... 385/92
6,287,128 B1 * 9/2001 Jones et al. ................ 439/76.1
6,439,918 B1 * 8/2002 Togami et al. .............. 439/372
6,494,623 B1 * 12/2002 Ahrens et al. ................ 385/76
6,788,540 B1 * 9/2004 Kruger et al. .............. 361/719
6,908,323 B1 * 6/2005 Ice ............................ 439/160
6,935,882 B1 * 8/2005 Hanley et al. .............. 439/372

* cited by examiner

*Primary Examiner*—Khiem Nguyen
(74) *Attorney, Agent, or Firm*—Allen, Dyer, Doppelt, Milbrath & Gilchrist, P.A.

(57) ABSTRACT

The invention relates to an optical transceiver system for use in a host device including an optical transceiver receptacle or cage with a heat dissipating structure mounted thereon. The heat dissipating structure is electronically powered by an external source in the host device, which are electrically connected by insertion of a transceiver module into the transceiver receptacle. The present invention enables optical transceivers to support very high data rates, e.g. >8 Gb/s, while still supporting very high density applications, e.g. SFF/SFP. Actuating features on the transceiver module and cage enable the heat dissipating structure to be turned on when the transceiver module is fully inserted into the cage, and turned off when the transceiver module is removed or at least partially removed from the cage.

20 Claims, 5 Drawing Sheets

14 23 19 11 12 17 28 16 13 26 27 21 22 20 18 29

HEAT DISSIPATING CAGES FOR OPTICAL TRANSCEIVER SYSTEMS

CROSS-REFERENCE TO RELATED APPLICATIONS

The present invention does not claim priority

TECHNICAL FIELD

The present invention relates to a heat dissipating cage for a pluggable electronic module, and in particular to a thermal electric cooler (TEC) or a fan mounted on an optical transceiver cage activated by insertion of an optical transceiver into the cage.

BACKGROUND OF THE INVENTION

Typically the size of optical transceiver modules are chosen by multiple suppliers in a consortium known as a multi-sourcing agreement (MSA). The MSA determines the specifications of the transceiver after considerable engineering effort is expended. Attributes, such as the physical size, are determined by the power dissipation of the module and typical customer cooling capabilities. Other factors contributing to the design process include the maturity of the internal technology needed to build the module, i.e. newer technology tend to be smaller and consume less power, but are less likely to be readily available in the marketplace quickly.

Currently, optical transceivers with data rates up to 4 Gb/s are packaged in small form factor (SFF or SFP) packages, while optical transceivers with higher data rates, e.g. 10 Gb/s, are in larger packages, such as XFP, X2, and XENPAK. A conventional XFP arrangement is illustrated in FIG. 1, in which an XFP transceiver module 1 is plugged into a host cage assembly 2 mounted on a host circuit board 3. The host cage assembly 2 includes a front bezel 4, a cage receptacle 5, and a host electrical connector 6. The transceiver module 1 is inserted through an opening in the front bezel 4, and through an open front of the cage receptacle 5, until an electrical connector on the transceiver module 1 engages the host electrical connector 6. The cage receptacle 5 has an opening 7 in the upper wall thereof through which a heat sink 8 extends into contact with the transceiver module 1 for dissipating heat therefrom. A clip 9 is provided for securing the heat sink 8 to the cage receptacle 5 and thereby into contact with the transceiver module 1. With this arrangement, the heat sink 8 can be changed to suit the owners' individual needs without changing the basic transceiver module 1.

Currently, there is motivation in the industry to extend the SFF/SFP package to 8 Gb/s or even higher data rates; however, considerable concern has been expressed on both temperature and EMI performance as well as how the large power consumption will limit the density of usage and/or the number of reaches (LR, ER, etc) available.

An object of the present invention is to overcome the shortcoming of the prior art by providing an optical transceiver arrangement that will support both very high data rates and very high density applications.

SUMMARY OF THE INVENTION

Accordingly, the present invention relates to an optical transceiver receptacle mountable on a host printed circuit board, in a host device with a host power source, for receiving an optical transceiver module with a first electrical connector comprising:

a frame including a pair of side walls, an upper wall, and an open front for receiving the optical transceiver module therethrough;

a second electrical connector at a rear of the frame for mating with the first electrical connector when the transceiver module is inserted into the frame;

heat dissipating means mounted on the upper wall of the frame electrically powered by the host device; and electrical connecting means for establishing an electrical connection between the heat dissipating means and the host power source when the optical transceiver module is fully inserted into the frame, and disconnecting the heat dissipating means from the host power source, when the optical transceiver module is at least partially removed from the frame.

BRIEF DESCRIPTION OF THE DRAWINGS

The invention will be described in greater detail with reference to the accompanying drawings which represent preferred embodiments thereof, wherein.

DETAILED DESCRIPTION

Figure 2:
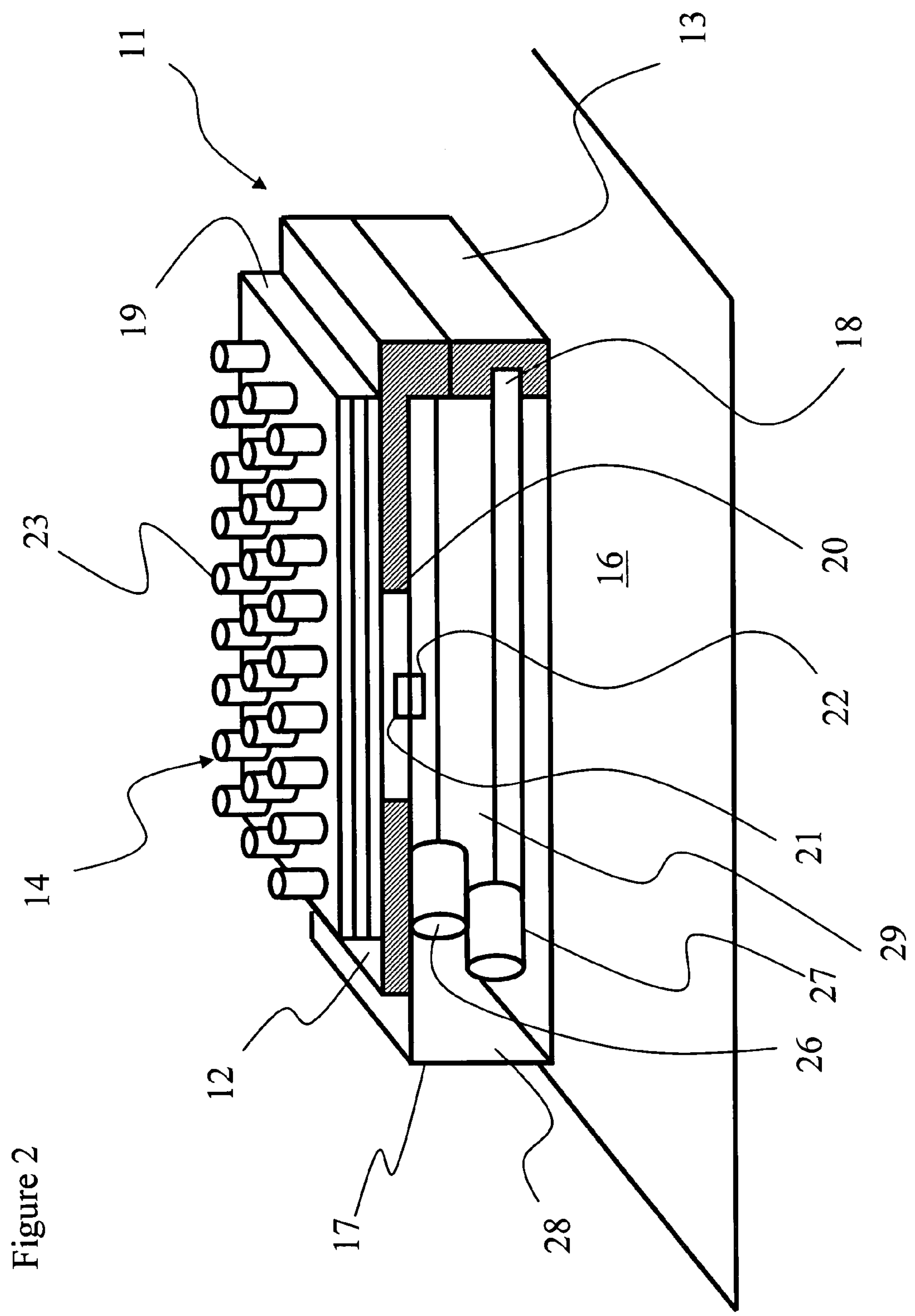
FIG. 2 is a partially sectioned isometric view of an optical transceiver arrangement according to the present invention.

With reference to FIG. 2, an optical transceiver receptacle 11 according to the present invention includes a basic rectangular frame or cage 12, a host electrical connector 13, and a heat dissipating structure 14 mounted on top of the frame 12. Typically, the frame 12 has a pair of side walls; an upper wall; a rear wall; and an open front positioned near an edge of the host printed circuit board 16. The side walls have connectors (not shown) extending from a bottom edge thereof for latching onto a host printed circuit board 16. Ideally the frame 12 is constructed of sheet metal, to provide electromagnetic shielding, with holes to enable airflow, although other structures that include other materials, e.g. plastic, and other structures are possible. The host electrical connector 13 is disposed adjacent to the rear wall of the frame 12, whereby when an optical transceiver module 17 with an electrical connector 18 extending therefrom, e.g. a card edge connector, is fully inserted into the receptacle 11, the module electrical connector 18 is fully engaged in the host electrical connector 13.

The heat dissipating structure 14 includes a thermal electric cooler (TEC) 19, which extends through an opening 20 in the upper wall of the frame 2 into contact with an upper surface of the optical transceiver module 17. First electrical contacts 21 are provided on the TEC 19 for engaging second electrical contacts 22 provided on the upper surface of the optical transceiver module 17, whereby power can be transmitted from the host device via the transceiver module 17 to the TEC 19. One or both of the first and second electrical contacts 21 and 22 can be spring biased outwardly to ensure good electrical contact. Alternatively, one or both of the first and second electrical contacts 21 and 22 extend outwardly for frictionally engaging each other when the transceiver module 17 is fully inserted into the frame 2. Accordingly, the TEC 19 is electrically connected to a source of power, i.e. switched to an on-state, by the first electrical contacts 21 engaging the second electrical contacts 22 when the transceiver module 17 is fully inserted into the frame 2, and switched to an off-state, when the transceiver module 17 is at least partially removed from the frame 2, i.e. the first and second electrical contacts 21 and 22 become disengaged. The TEC 19 or the module 17 can include a thermostat, e.g. provided in the module's firmware, for actuating the TEC 19, while in the on-state, whenever the temperature of the module 17 rises above a predetermined temperature, and deactivating the TEC 19, whenever the temperature of the module 17 falls below the predetermined temperature. The thermostat enables the overall life of the TEC 19 to be extended, as well as reducing overall power consumption. Alternatively, the TEC 19 can be actuated upon entry into the on-state, i.e. when the module 17 is fully inserted into the frame 2.

Figure 1:
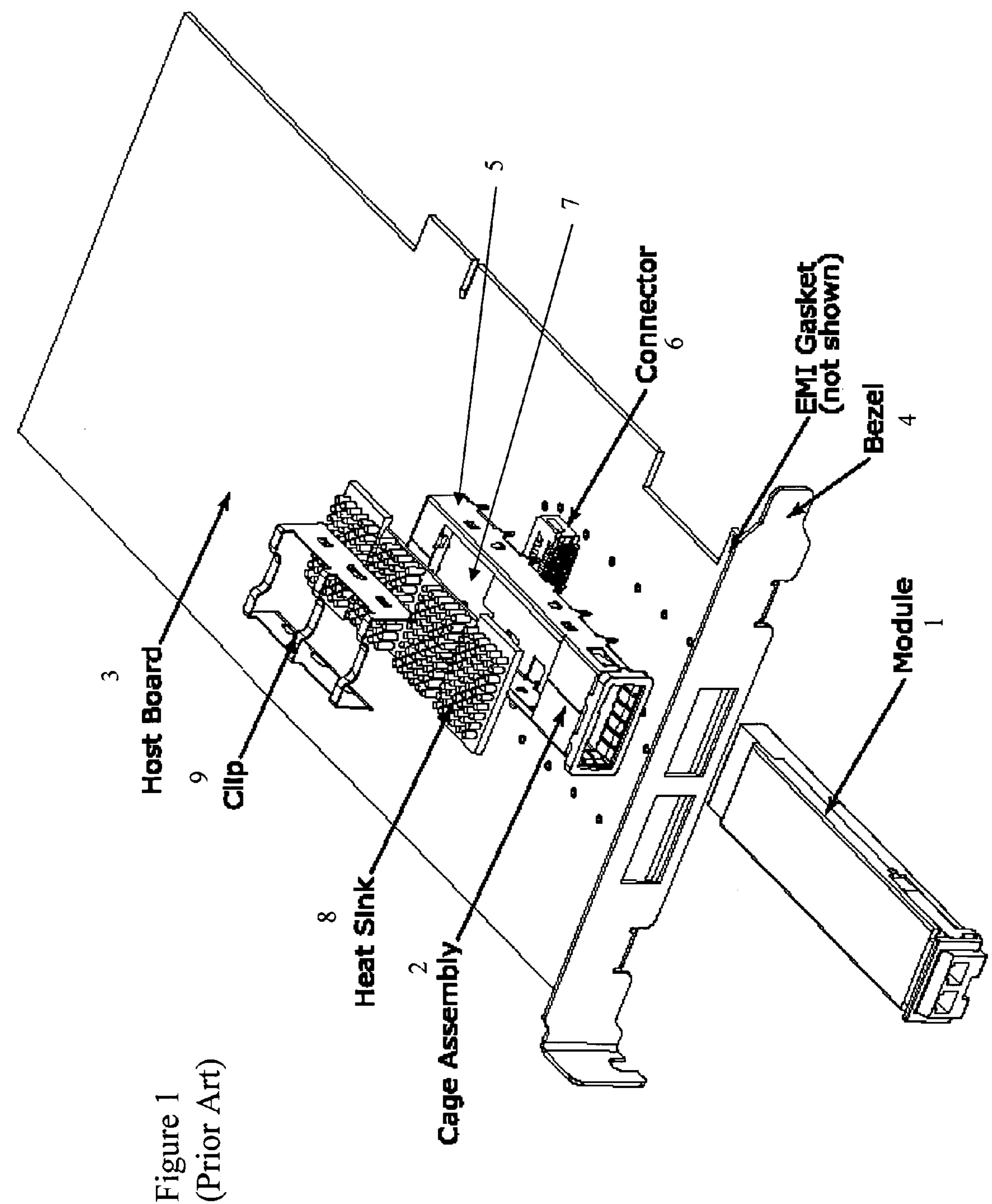
FIG. 1 is a partially exploded isometric view of a conventional XFP optical transceiver arrangement.

To improve the thermal performance of the TEC 19, a heat sink 23 with heat dissipating pins or fins can be provided as part of the heat dissipating structure 14. A clip, as illustrated in FIG. 1, can be provided to hold the heat dissipating structure 14 in place, and spring bias the heat dissipating structure 14 into contact with the transceiver module 17 and the first electrical contact 21 into contact with the second electrical contact 22.

The optical transceiver module 17 includes the standard opto-electronic components of conventional transceivers including, a receiver optical sub-assembly (ROSA) 26, a transmitter optical sub-assembly (TOSA) 27, on optical connector 28 for aligning an optical fiber with the ROSA 26 and the TOSA 27, and a module printed circuit board 29 including circuitry and components for controlling the ROSA 26 and TOSA 27. Ideally the module electrical connector 18 is formed on an edge of the module printed circuit board 29.

Figure 3:
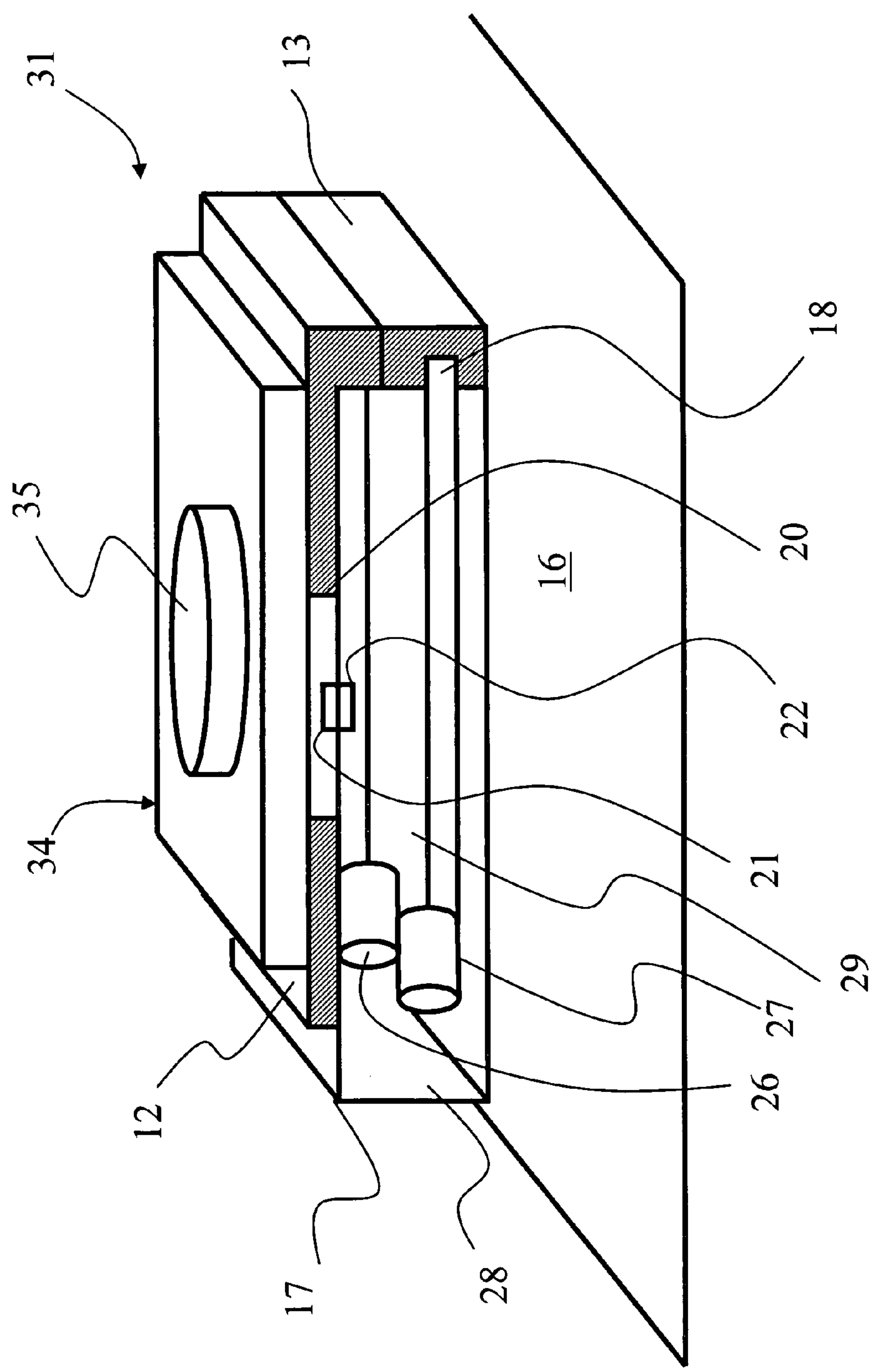
FIG. 3 is a partially sectioned isometric view of an alternative embodiment of an optical transceiver arrangement according to the present invention.

With reference to FIG. 3, an optical transceiver receptacle 31 according to an alternative embodiment of the present invention includes the basic rectangular frame or cage 12, the host electrical connector 13, and a heat dissipating structure 34 mounted on top of the frame 12. The transceiver module 17 and the component parts thereof are identical to those of FIG. 2. In this embodiment, the heat dissipating structure 14' includes a low profile fan 35, which is electrically connected with a source of power, i.e. switched to the on-state, when the first electrical contact 21 engages the second electrical contact 22, i.e. when the transceiver module 17 with module electrical connector 18 is fully inserted into the frame 12 with host electrical connector 13. The fan 35 or the module 17 can include a thermostat, e.g. provided in the module's firmware, for actuating the fan 35, while in the on-state, whenever the temperature of the module 17 rises above a predetermined temperature, and deactivating the fan 35, whenever the temperature of the module 17 falls below the predetermined temperature. The thermostat enables the overall life of the fan 35 to be extended, as well as reducing overall power consumption. Alternatively, the fan 35 can be actuated automatically upon entry into the on-state, i.e. when the module 17 is fully inserted into the frame 2.

Figure 4:
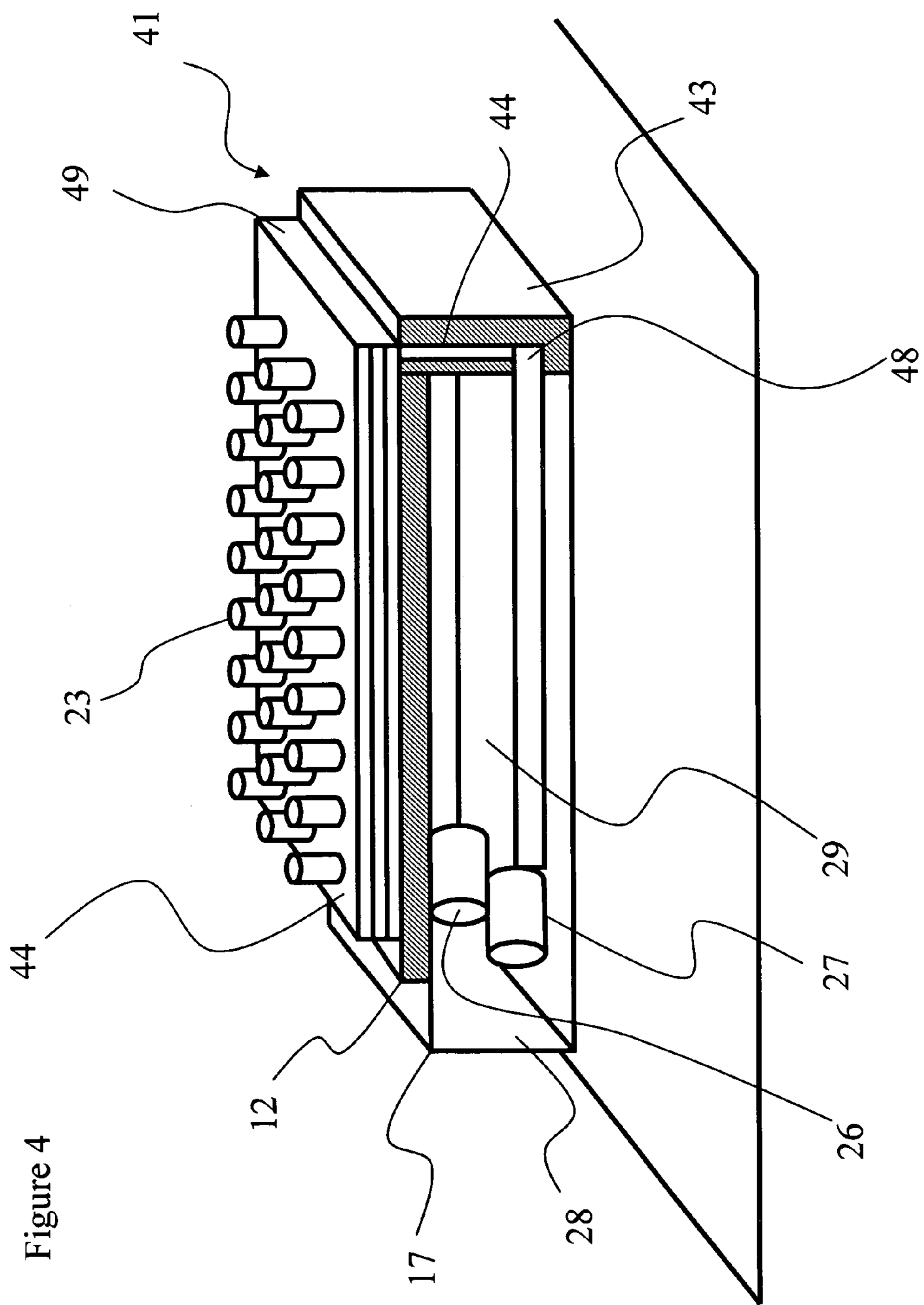
FIG. 4 is a partially sectioned isometric view of an alternative embodiment of an optical transceiver arrangement according to the present invention.

With reference to FIG. 4, an optical transceiver receptacle 41 according to an alternative embodiment of the present invention includes the basic rectangular frame or cage 12, a host electrical connector 43, and a heat dissipating structure 44 mounted on top of the frame 12. The transceiver module 17 and the component parts thereof are identical to those of FIG. 2, except that the electrical actuator for the heat dissipating structure 44, i.e. the second electrical contact 22, is replaced by a keying feature on a module electrical connector 48. In this embodiment, the heat dissipating structure 44 includes a TEC 49, which is electrically connected to a source of power when the keying feature on the module electrical connector 48 engages a mating feature on the host electrical connector 43, i.e. when the transceiver module 17 is fully inserted into the frame 12, thereby closing an electric circuit 44 providing power from the host system to the TEC 49. The TEC 49 or the module 17 can include a thermostat, e.g. provided in the module's firmware, for actuating the TEC 49, while in the on-state, whenever the temperature of the module 17 rises above a predetermined temperature, and deactivating the TEC 49, whenever the temperature of the module 17 falls below the predetermined temperature. The thermostat enables the overall life of the TEC 49 to be extended, as well as reducing overall power consumption. Alternatively, the TEC 49 can be actuated upon entry into the on-state, i.e. when the module 17 is fully inserted into the frame 2.

To improve the thermal performance of the TEC 49, the heat sink 23 with heat dissipating pins or fins can be provided as part of the heat dissipating structure 44. A clip, as illustrated in FIG. 1, can be provided to hold the heat dissipating structure 44 in place, and spring bias the heat dissipating structure 44 into contact with the transceiver module 17.

Figure 5:
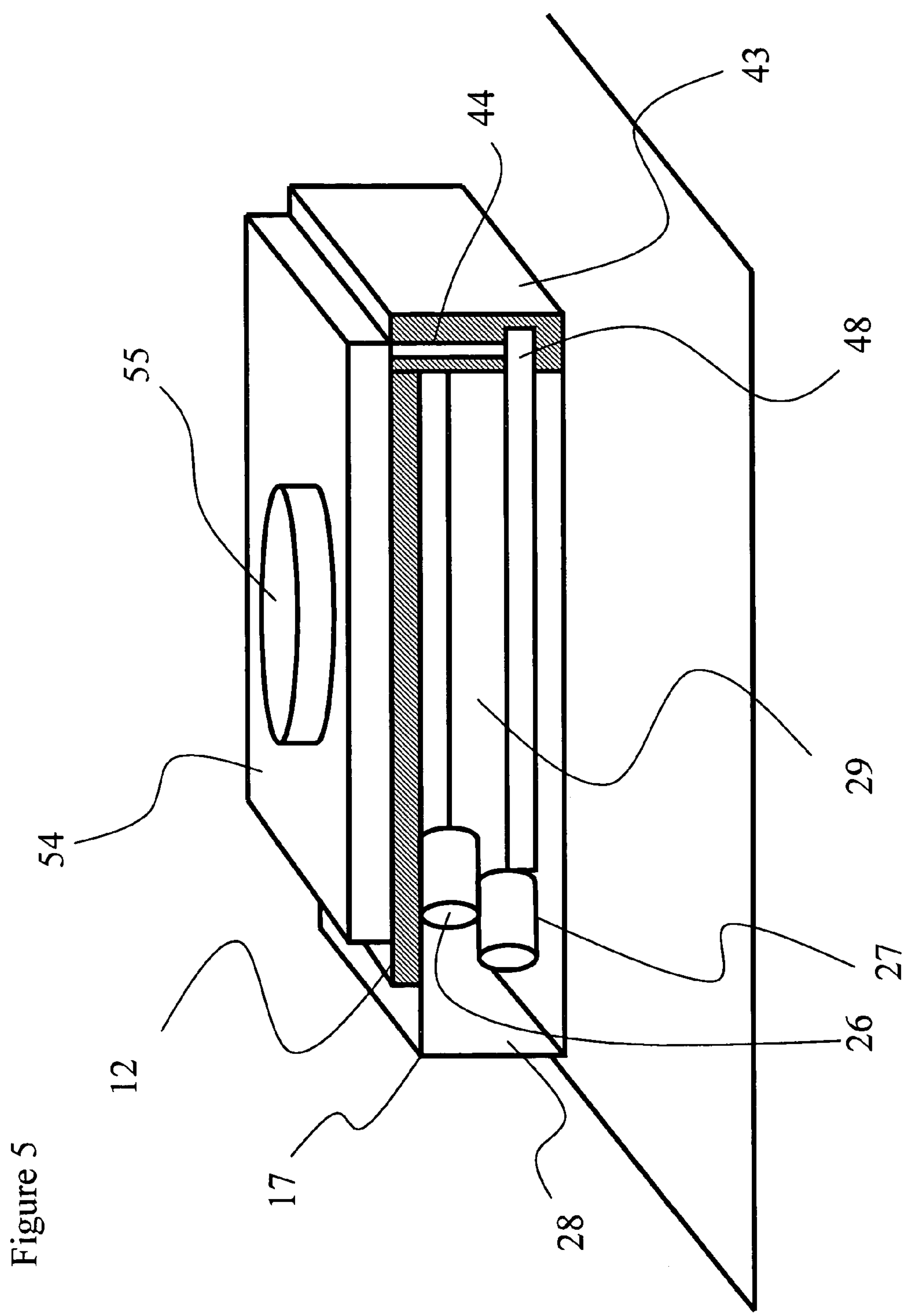
FIG. 5 is a partially sectioned isometric view of an alternative embodiment of an optical transceiver arrangement according to the present invention.

With reference to FIG. 5, an optical transceiver receptacle 51 according to an alternative embodiment of the present invention includes the basic rectangular frame or cage 12, the host electrical connector 43, and a heat dissipating structure 54 mounted on top of the frame 12. The transceiver module 17 and the component parts thereof are identical to those of FIG. 2, except that the electrical actuator for the heat dissipating structure 54, i.e. the second electrical contact 22, is replaced by the keying feature on the module electrical connector 48. In this embodiment, the heat dissipating structure 54 includes a low profile fan 55, which is electrically connected to a source of power when the keying feature on the module electrical connector 48 engages a mating feature on the host electrical connector 43, i.e. when the transceiver module 17 is fully inserted into the frame 12, thereby closing an electric circuit 44 providing power from the host system to the fan 55. The fan 55 or the module 17 can include a thermostat, e.g. provided in the module's firmware, for actuating the fan 55, while in the on-state, whenever the temperature of the module 17 rises above a predetermined temperature, and deactivating the fan 55, whenever the temperature of the module 17 falls below the predetermined temperature. The thermostat enables the overall life of the fan 55 to be extended, as well as reducing overall power consumption. Alternatively, the fan 55 can be actuated upon entry into the on-state, i.e. when the module 17 is fully inserted into the frame 2.

In an alternative embodiment the TEC or the fan can be electrically connected to the source of power, i.e. turned on/off by the host computer sending an activation code via a serial bus in the module 17 and writing to particular registers in the module's 17 eeprom. The module 17 can periodically examine the registers and depending on the state, turn on/off the TEC or the fan.

We claim:

1. An optical transceiver receptacle mountable on a host printed circuit board, in a host device with a host power source, for receiving an optical transceiver module with a first electrical connector comprising:

a frame including a pair of side walls, an upper wall, and an open front for receiving the optical transceiver module therethrough;

a second electrical connector at a rear of the frame for mating with the first electrical connector when the transceiver module is inserted into the frame;

heat dissipating means mounted on the upper wall of the frame electrically powered by the host device; and electrical connecting means for establishing an electrical connection between the heat dissipating means and the host power source when the optical transceiver module is fully inserted into the frame, and disconnecting the heat dissipating means from the host power source, when the optical transceiver module is at least partially removed from the frame.

2. The receptacle according to claim 1, wherein the heat dissipating means comprises a thermal electric cooler.

3. The receptacle according to claim 2, wherein the heat dissipating means also includes a heat sink with heat dissipating pins or fins.

4. The receptacle according to claim 3, wherein the heat dissipating means extends through an opening in the upper wall of the frame for contacting the transceiver module.

5. The receptacle according to claim 1, wherein the heat dissipating means comprises a fan.

6. The receptacle according to claim 1, wherein the electrical connecting means comprises first electrical contacts extending from the heat dissipating means through an opening in the upper wall of the frame; and wherein the transceiver module includes second electrical contacts on an upper surface thereof for engaging the first electrical contacts when the transceiver module is fully inserted into the frame.

7. The receptacle according to claim 6, wherein the heat dissipating means comprises a thermal electric cooler.

8. The receptacle according to claim 6, wherein the heat dissipating means comprises a fan.

9. The receptacle according to claim 6, further comprising a thermostat for activating the heat dissipating means when the transceiver module reaches a temperature above a predetermined temperature.

10. The receptacle according to claim 1, wherein the electrical connecting means comprises a keying feature on the first electrical connector for closing an electrical circuit between the heat dissipating means and the host power source when the first electrical connector is plugged into the second electrical connector.

11. The receptacle according to claim 10, wherein the heat dissipating means comprises a thermal electric cooler.

12. The receptacle according to claim 10, wherein the heat dissipating means comprises a fan.

13. The receptacle according to claim 10, further comprising a thermostat for activating the heat dissipating means when the transceiver module reaches a temperature above a predetermined temperature.

14. An optical transceiver system for mounting on a host printed circuit board comprising:

an optical transceiver including a first electrical connector at a first end thereof, and a first electrical actuator; and an optical transceiver receptacle for receiving the optical transceiver module comprising:

a frame including a pair of side walls, an upper wall, and an open front for receiving the optical transceiver module therethrough;

a second electrical connector at a rear of the frame for mating with the first electrical connector when the transceiver module is inserted into the frame;

heat dissipating means mounted on the upper wall of the frame electrically powered by the host device; and a second electrical actuator for engaging the first electrical actuator for switching the heat dissipating means to an on-state when the optical transceiver module is fully inserted into the frame, and for switching the heat dissipating means to an off-state when the optical transceiver module is at least partially removed from the frame.

15. The system according to claim 14, wherein the first electrical actuator is mounted on an upper surface of the transceiver module; and wherein the second electrical actuator is mounted on the heat dissipating means, which extends through an opening in the frame.

16. The system according to claim 14, wherein the first electrical actuator comprises a keying feature on the first electrical connector; and wherein the second electrical actuator comprises a mating feature on the second electrical connector for closing an electrical circuit between the heat dissipating means and an external power source, when the first electrical connector is plugged into the second electrical connector.

17. The receptacle according to claim 14, wherein the heat dissipating means comprises a thermal electric cooler.

18. The receptacle according to claim 17, wherein the heat dissipating means also includes a heat sink with heat dissipating pins or fins.

19. The receptacle according to claim 14, wherein the heat dissipating means comprises a fan.

20. The receptacle according to claim 14, wherein the optical transceiver further comprises a thermostat for activating the heat dissipating means in the on-state, when the optical transceiver reaches a temperature above a predetermined temperature.

* * * * *